E. E. COOK.
HORSESHOE.
APPLICATION FILED MAR. 21, 1912.
1,035,537.
Patented Aug. 13, 1912.
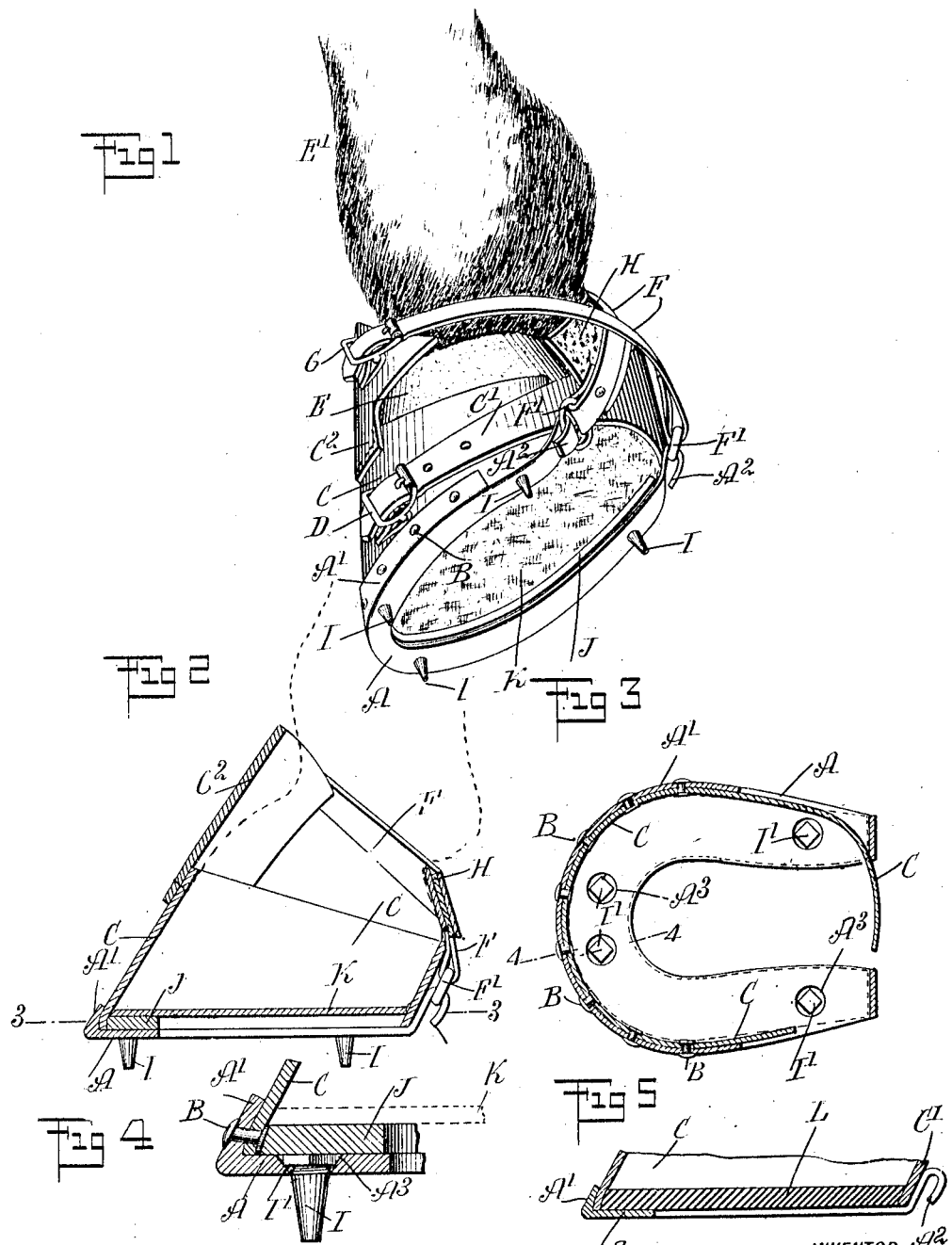
WITNESSES
INVENTOR
Edward E. Cook
BY
ATTORNEYS

UNITED STATES PATENT OFFICE.

EDWARD E. COOK, OF SPRINGFIELD, NEW JERSEY.

HORSESHOE.

1,035,537.

Specification of Letters Patent. Patented Aug. 13, 1912.

Application filed March 21, 1912. Serial No. 685,138.

*To all whom it may concern:*

Be it known that I, EDWARD E. COOK, a citizen of the United States, and a resident of Springfield, in the county of Union and State of New Jersey, have invented a new and Improved Horseshoe, of which the following is a full, clear, and exact description.

The object of the invention is to provide a new and improved horseshoe arranged for convenient and quick attachment to the animal's hoof without the use of horseshoe nails, and to allow of readily replacing worn out calks with new ones and insuring long life of the horseshoe.

For the purpose mentioned use is made of a horseshoe having an upturned flange and terminating at the heels in loops engaged by crossed straps buckled to a front upward extension of a boot connected to the said flange of the horseshoe. Use is also made of calks removably inserted in the shoe and having heads countersunk in the top of the shoe, and a top plate overlying the said horseshoe and the heads of the calks.

A practical embodiment of the invention is represented in the accompanying drawings forming a part of this specification, in which similar characters of reference indicate corresponding parts in all the views.

Figure 1 is a perspective view of the horseshoe as applied; Fig. 2 is a sectional side elevation of the horseshoe; Fig. 3 is a sectional plan view of the same on the line 3—3 of Fig. 2; Fig. 4 is an enlarged sectional side elevation of the same on the line 4—4 of Fig. 3; and Fig. 5 is a sectional side elevation of the horseshoe arranged without calks to provide a flat surface on the under side of the shoe.

A flat shoe A of the usual shape is provided at the toe and sides with an integral upwardly-extending flange A' to the inside of which is fastened by rivets or other fastening means B a boot C, in the form of a piece of leather gradually diminishing in height from the front toward the rear and terminating at one end in a strap C' overlying the other end of the boot to finally connect with a buckle D at the side of the boot. By the arrangement described the boot C with the shoe A attached thereto can be readily strapped to the animal's hoof E so as to hold the parts securely in place. The heel ends of the shoe A terminate in upwardly-extending hooks or loops $A^2$ engaged by rings F' on the rear ends of straps F crossing each other at the rear of the animal's hoof to then extend forwardly to connect to buckles G held on an upward extension $C^2$ attached to the front upper portion of the boot C and forming a part thereof. A pad H is placed under the crossing of the straps F so as to protect the fet-lock of the animal's leg E' to prevent the straps F from chafing. It will be noticed that by providing the boot C with the extension $C^2$ and connecting the latter by the straps with the rear ends of the shoe A, the shoe and the boot C are firmly held in place to prevent accidental detachment of the horsehoe from the animal's hoof.

The horseshoe A is provided at the front and sides with apertures $A^3$ engaged by removable calks I having heads I' countersunk in the conical apertures $A^3$, as will be readily understood by reference to Fig. 4. The calks I are preferably provided with screw threads to screw in the threads in the apertures $A^3$ to hold the calks in place on the shoe, but the shoe A and the heads K are overlaid by a top plate J of approximately horseshoe shape, that is, corresponding to the shape of the shoe A. The under side of the animal's hoof rests on a protecting or covering pad K placed on top of the top plate J for the under side of the animal's hoof to rest on, as will be readily understood by reference to Fig. 4.

When the horseshoe is used as a flat shoe, that is, without calks I, then a covering plate L overlies the shoe A, as indicated in Fig. 5, and the calks I are dispensed with.

Having thus described my invention, I claim as new and desire to secure by Letters Patent:

1. A horseshoe, comprising a boot provided with a strap and buckle for fastening the boot to the hoof, the boot having an upward extension at the front, a shoe provided with an upwardly-extending flange engaged at the inside by the lower end of the said boot, the heel ends of the shoe terminating in loops, fastening means for fastening the said lower end of the boot to the said flange, straps connected with the said loops and crossing each other, and buckles on the said boot extension and to which the said straps are buckled.

2. A horseshoe, comprising a boot provided with a strap and buckle for fastening the boot to the hoof, the boot having an upward extension at the front, a shoe provided with an upwardly-extending flange engaged at the inside by the lower end of the said boot, the heel ends of the shoe terminating in loops, fastening means for fastening the said lower end of the boot to the said flange, straps connected with the said loops and crossing each other, buckles on the said boot extension and to which the said straps are buckled, and a pad under the said straps at the crossing thereof.

3. A horseshoe, comprising a boot provided with a strap and buckle for fastening the boot to the hoof, the boot having an upward extension at the front, a shoe provided with an upwardly-extending flange engaged at the inside by the lower end of the said boot, the heel ends of the shoe terminating in loops, fastening means for fastening the said lower end of the boot to the said flange, straps connected with the said loops and crossing each other, buckles on the said boot extension and to which the said straps are buckled, calks removably held in apertures of the said shoe and provided with heads countersunk in the upper face of the shoe, and a top plate, the said shoe overlying the same and the said calk heads.

4. A horseshoe, comprising a boot provided with a strap and buckle for fastening the boot to the hoof, the boot having an upward extension at the front, a shoe provided with an upwardly-extending flange engaged at the inside by the lower end of the said boot, the heel ends of the shoe terminating in loops, fastening means for fastening the said lower end of the boot to the said flange, straps connected with the said loops and crossing each other, buckles on the said boot extension and to which the said straps are buckled, calks removably held in apertures of the said shoe and provided with heads countersunk in the upper face of the shoe, a top plate, the said shoe overlying the same and the said calk heads, and a hoof pad for the under side of the hoof to rest on and seated on top of the said top plate.

5. A horseshoe, comprising a boot encircling the hoof and terminating at one end in a strap overlying the other end of the boot, a buckle on the outside of the boot near the front end and engaged by the said boot strap, a front extension on the said boot and provided at the sides with buckles, a shoe attached to the said boot, the boot being disconnected with the shoe at the heel, and crossed straps secured directly to the heel ends of the shoe and engaging the said extension buckles.

In testimony whereof I have signed my name to this specification in the presence of two subscribing witnesses.

EDWARD E. COOK.

Witnesses:
 THEO. G. HOSTER,
 PHILIP D. ROLLHAUS.

---

Copies of this patent may be obtained for five cents each, by addressing the "Commissioner of Patents, Washington, D. C."